(12) United States Patent
Kuusisaari et al.

(10) Patent No.: US 9,762,532 B2
(45) Date of Patent: Sep. 12, 2017

(54) METHOD AND NETWORK DEVICE FOR CONFIGURING A DATA TRANSFER NETWORK

(71) Applicant: CORIANT OY, Espoo (FI)

(72) Inventors: Juhamatti Kuusisaari, Helsinki (FI); Ville Hallivuori, Espoo (FI)

(73) Assignee: CORIANT OY, Espoo (FI)

( * ) Notice: Subject to any disclaimer, the term of this patent is extended or adjusted under 35 U.S.C. 154(b) by 210 days.

(21) Appl. No.: 14/453,653

(22) Filed: Aug. 7, 2014

(65) Prior Publication Data

US 2015/0049637 A1 Feb. 19, 2015

(30) Foreign Application Priority Data

Aug. 14, 2013 (FI) .................................. 20135830

(51) Int. Cl.
*H04L 12/24* (2006.01)
*H04L 29/12* (2006.01)
*H04L 12/751* (2013.01)
*H04L 12/745* (2013.01)

(52) U.S. Cl.
CPC .......... *H04L 61/2007* (2013.01); *H04L 45/02* (2013.01); *H04L 61/2061* (2013.01); *H04L 45/748* (2013.01)

(58) Field of Classification Search
CPC .................................................. H04L 61/2007
USPC ........................................................ 370/254
See application file for complete search history.

(56) References Cited

U.S. PATENT DOCUMENTS

| | | | |
|---|---|---|---|
| 6,697,325 B1 * | 2/2004 | Cain ....................... | H04L 45/02 370/217 |
| 6,980,547 B1 | 12/2005 | Gally et al. | |
| 7,693,942 B2 * | 4/2010 | Nale ................... | H04N 1/00127 709/202 |

(Continued)

FOREIGN PATENT DOCUMENTS

CN          101783769          7/2010

OTHER PUBLICATIONS

Launois et al., "The Paths Toward IPv6 Multihoming", IEEE Communications Surveys & Tutorials, The Electronic Magazine of Original Peer-Reviewed Survey Articles, 2nd Quarter 2006, vol. 8, No. 2, pp. 38-51.

(Continued)

*Primary Examiner* — Parth Patel
(74) *Attorney, Agent, or Firm* — Young & Thompson

(57) ABSTRACT

In a data transfer network, a network device (102) receives at its first data interface an identifier message transferred via a first data transfer path from another network device (106). The network device compares the identifier message to earlier received identifier messages. If the identifier message matches an earlier received identifier message received at another data interface and transferred via a second data transfer path from the other network device, the network device updates its forwarding database to express that the other network device is accessible also via the first data interface, and transmits address information related to the other network device via the first data interface so as to determine the first data transfer path to be an alternative for the second data transfer path. The first and second data transfer paths can be used for protecting each other and/or for load sharing.

16 Claims, 4 Drawing Sheets

(56) References Cited

U.S. PATENT DOCUMENTS

| | | | | |
|---|---|---|---|---|
| 7,729,351 | B2* | 6/2010 | Tatar | H04L 49/1546 370/390 |
| 7,869,436 | B1* | 1/2011 | Adler | H04L 12/4641 370/351 |
| 7,881,296 | B2* | 2/2011 | Joshi | H04L 12/4641 370/392 |
| 7,974,218 | B2* | 7/2011 | White | H04L 41/082 370/254 |
| 7,987,266 | B2* | 7/2011 | Joshi | H04L 67/1095 709/224 |
| 8,015,268 | B2* | 9/2011 | Duffy | G06F 1/12 370/254 |
| 8,249,064 | B1 | 8/2012 | Pannell et al. | |
| 8,416,701 | B1 | 4/2013 | Smead et al. | |
| 8,724,456 | B1* | 5/2014 | Hong | G06F 11/00 370/225 |
| 8,811,961 | B2* | 8/2014 | Lee | H04L 1/1607 370/216 |
| 9,178,780 | B2* | 11/2015 | Rijsman | H04L 41/142 |
| 9,276,769 | B2* | 3/2016 | Hsiao | H04L 12/4641 |
| 2003/0210702 | A1* | 11/2003 | Kendall | H04L 45/00 370/401 |
| 2004/0078485 | A1* | 4/2004 | Narayanan | H04L 45/742 709/242 |
| 2005/0141552 | A1* | 6/2005 | Schwalb | H04Q 3/0025 370/466 |
| 2006/0182034 | A1* | 8/2006 | Klinker | H04L 12/2602 370/238 |
| 2006/0268681 | A1 | 11/2006 | Raza | |
| 2007/0121615 | A1* | 5/2007 | Weill | H04L 12/4633 370/389 |
| 2007/0153741 | A1* | 7/2007 | Blanchette | H04L 45/66 370/331 |
| 2008/0056293 | A1* | 3/2008 | Robbins | H04L 12/185 370/432 |
| 2008/0259925 | A1 | 10/2008 | Droms et al. | |
| 2009/0073996 | A1* | 3/2009 | Swallow | H04L 45/04 370/401 |
| 2009/0147692 | A1* | 6/2009 | Hasan | H04L 41/5009 370/252 |
| 2010/0008363 | A1* | 1/2010 | Ee | H04L 12/2697 370/392 |
| 2010/0124231 | A1* | 5/2010 | Kompella | H04L 45/04 370/401 |
| 2011/0202612 | A1* | 8/2011 | Craig | H04L 63/0892 709/206 |
| 2011/0225293 | A1* | 9/2011 | Rathod | G06F 17/30867 709/224 |
| 2012/0198085 | A1* | 8/2012 | Xu | H04L 29/12066 709/228 |
| 2013/0003596 | A1 | 1/2013 | Lelkens et al. | |
| 2013/0086236 | A1* | 4/2013 | Baucke | H04L 45/50 709/223 |
| 2013/0229924 | A1* | 9/2013 | Salam | H04L 43/0811 370/244 |
| 2013/0272305 | A1* | 10/2013 | Lefebvre | H04L 47/24 370/392 |
| 2013/0282909 | A1* | 10/2013 | Alessi | G06F 17/30864 709/226 |
| 2014/0198793 | A1* | 7/2014 | Allu | H04L 45/245 370/392 |
| 2015/0248468 | A1* | 9/2015 | Cheng | H04L 67/1095 707/621 |

OTHER PUBLICATIONS

European Search Report, dated Dec. 23, 2014, from corresponding EP application.

Finnish Search report dated Jun. 5, 2014, in corresponding Finnish Priority application.

* cited by examiner

METHOD AND NETWORK DEVICE FOR CONFIGURING A DATA TRANSFER NETWORK

FIELD OF THE INVENTION

The invention relates generally to configuration of a data transfer network. The data transfer network can be, for example but not necessarily, arranged to support the Internet Protocol "IP". More particularly, the invention relates to a method for network configuration, to a network device, to a data transfer network, and to a computer program for network configuration.

BACKGROUND

Data transfer networks include network devices such as, for example, Internet Protocol routers and data transfer links connecting the network devices to each other. Concerning, for example, data transfer networks employing the Internet Protocol "IP", there are several methods to configure host network addresses, i.e. host IP-addresses, but much less means are provided to router interface network address, i.e. interface IP-address, configuration. Commonly in IPv4 "Internet Protocol—version 4" enabled networks, hosts have their changing network addresses through the Dynamic Host Configuration Protocol "DHCP" during boot-up. Routers have usually statically allocated permanent network addresses from global or non-global address blocks. The IPv6 "Internet Protocol—version 6" and its neighbor discovery schema "NEIGHD" allow auto-configuration with Router Solicitation and Router Advertisement messages which can be used to auto-configure host IPv6-addresses. Nevertheless, routers of an IPv6-data transfer network are not included in the auto-configuration framework and the additions of IPv6-address auto-configuration "ADDRCONF" and the above-mentioned Neighbor Discovery scheme do not remove the complexity of configuring routers in an IPv6-data transfer network. Furthermore, for the purpose of protection and/or load sharing between different data transfer links of a data transfer network, there is many times a need to configure the routing and forwarding databases of routers or other network devices so that there are two or more alternative data transfer paths between the routers or other network devices under consideration.

Publication US2008259925 discloses a method for delegating Internet Protocol network address-prefixes between routers that are connected with data transfer links to each other so as to constitute a hierarchical logical arrangement. The method comprises detecting, by a router, a first router advertisement message received from another router situated at a higher level of the hierarchical logical arrangement. The first router advertisement message is arranged to specify a first network address-prefix owned by the other router and usable for address auto-configuration in the router. The router can perform recursive network address-prefix delegation and assign a sub-portion of the first network address-prefix to other routers situated at a lower level of the hierarchical logical arrangement. Hence, the routers can automatically obtain delegated network address-prefixes from received router advertisement messages specifying prefix delegation information options. However, the method does not provide tools for arranging parallel data transfer paths between separate routers or other network devices.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention there is provided a new data transfer network comprising network devices interconnected with data transfer links. The network devices include at least one first network device and at least one second network device. The first network device is arranged to:

compare a first identifier message received at a first one of data interfaces of the first network device to earlier received identifier messages, each data interface comprising an ingress section for receiving data and an egress section for transmitting data, and the first identifier message being transferred from the second network device to the first network device via a first data transfer path through the data transfer network, and in response to a situation in which the first identifier message matches a second identifier message that is one of the earlier received identifier messages and has been received at a second one of the data interfaces of the first network device: a) update a forwarding database to express that one or more protocol addresses associated to the second network device accessible via the second one of the data interfaces of the first network device is/are associated to the first one of the data interfaces of the first network device so as to indicate that the second network device is accessible also via the first one of the data interfaces of the first network device, and b) transmit information defining the one or more protocol addresses via the first one of the data interfaces of the first network device so as to determine the first data transfer path to be an alternative of a second data transfer path via which the second identifier message has been transferred from the second network device to the first network device.

Concerning the data traffic between the first and second network devices, the first and second data transfer paths can be used for protecting each other and/or for sharing load among different data transfer links.

In a data transfer network according to an exemplifying embodiment of the invention, the network devices are organized to constitute a hierarchical logical arrangement where the second network device is at a lower level of the network hierarchy than the first network device and a third network device of the data transfer network is at an upper level of the network hierarchy than the first network device. The first network device can be arranged to receive information defining the one or more protocol addresses from the third network device and in turn to deliver, to the second network device, information defining protocol addresses to be allocated for the second network device.

The communication protocol being used by the network devices can be, for example but not necessarily, the Internet Protocol "IP". In this specific case, the one or more protocol addresses associated to the second one of the data interfaces can be expressed with a network address-prefix defining a sub-set of the Internet address space. The Internet Protocol can be either IPv4 or IPv6. For another example, the communication protocol can be the Connection-Less Network Service "CLNS" that uses addressing data conforming to the ISO 10589 specification "International Standards Organization".

Each identifier message can be, for example but not necessarily, a Media Access Control "MAC" address. The above-mentioned first and second identifier messages may contain a Media Access Control address related to the second network device, where the first identifier message is transferred via a first data interface of the second network device and the second identifier message is transferred via a second data interface of the second network device so that the first and second identifier messages are transferred along different data transfer paths from the second network device to the first network device.

In accordance with the invention there is provided also a new network device that can be used as an element of the above-described data transfer network. The network device comprises:

data interfaces each comprising an ingress section for receiving data from a data transfer network and an egress section for transmitting data to the data transfer network, and a processing circuitry arranged to:

compare a first identifier message received at a first one of the data interfaces to earlier received identifier messages, and in response to a situation in which the first identifier message matches a second identifier message that is one of the earlier received identifier messages and has been received at a second one of the data inter-faces: a) update a forwarding database to express that one or more protocol addresses associated to another network device originated the second identifier message and accessible via the second one of the data interfaces is/are associated to the first one of the data interfaces so as to indicate that the other network device is accessible also via the first one of the data interfaces, and b) transmit information defining the one or more protocol addresses via the first one of the data interfaces so as to enable creation of a data transfer path through the data transfer network and via the first one of the data interfaces for data traffic addressed to the other network device.

In accordance with the invention there is provided also a new method for network configuration. The method comprises:

receiving a first identifier message at a first one of data interfaces of a network device, each data interface comprising an ingress section for receiving data from a data transfer network and an egress section for transmitting data to the data transfer network, comparing the first identifier message to earlier received identifier messages, and in response to a situation in which the first identifier message matches a second identifier message that is one of the earlier received identifier messages and has been received at a second one of the data interfaces of the network device: a) updating a forwarding database to express that one or more protocol addresses associated to another network device originated the second identifier message and accessible via the second one of the data interfaces of the network device is/are associated to the first one of the data interfaces of the network device so as to indicate that the other network device is accessible also via the first one of the data interfaces of the network device, and b) transmitting information defining the one or more protocol addresses via the first one of the data interfaces so as to enable creation of a data transfer path through the data transfer network and via the first one of the data interfaces of the network device for data traffic addressed to the other network device.

In accordance with the invention there is provided also a new computer program for network configuration. The computer program comprises computer executable instructions for controlling a programmable processing circuitry of a network device to:

compare a first identifier message received at a first one of data interfaces of the network device to earlier received identifier messages, and in response to a situation in which the first identifier message matches a second identifier message that is one of the earlier received identifier messages and has been received at a second one of the data interfaces of the network device: a) update a forwarding database to express that one or more protocol addresses associated to a another network device originated the second identifier message and accessible via the second one of the data interfaces of the network device is/are associated to the first one of the data interfaces of the network device so as to indicate that the other network device is accessible also via the first one of the data interfaces of the network device, and b) transmit information defining the one or more protocol addresses via the first one of the data interfaces so as to enable creation of a data transfer path through the data transfer network and via the first one of the data interfaces of the network device for data traffic addressed to the other network device.

In accordance with the invention there is provided also a new computer program product. The computer program product comprises a non-volatile computer readable medium, e.g. a compact disc "CD", encoded with a computer program according to the invention.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of unrecited features. The features recited in depending claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The exemplifying embodiments of the invention and their advantages are explained in greater detail below in the sense of examples and with reference to the accompanying drawings, in which.

DESCRIPTION OF EXEMPLIFYING EMBODIMENTS

Figure 1:
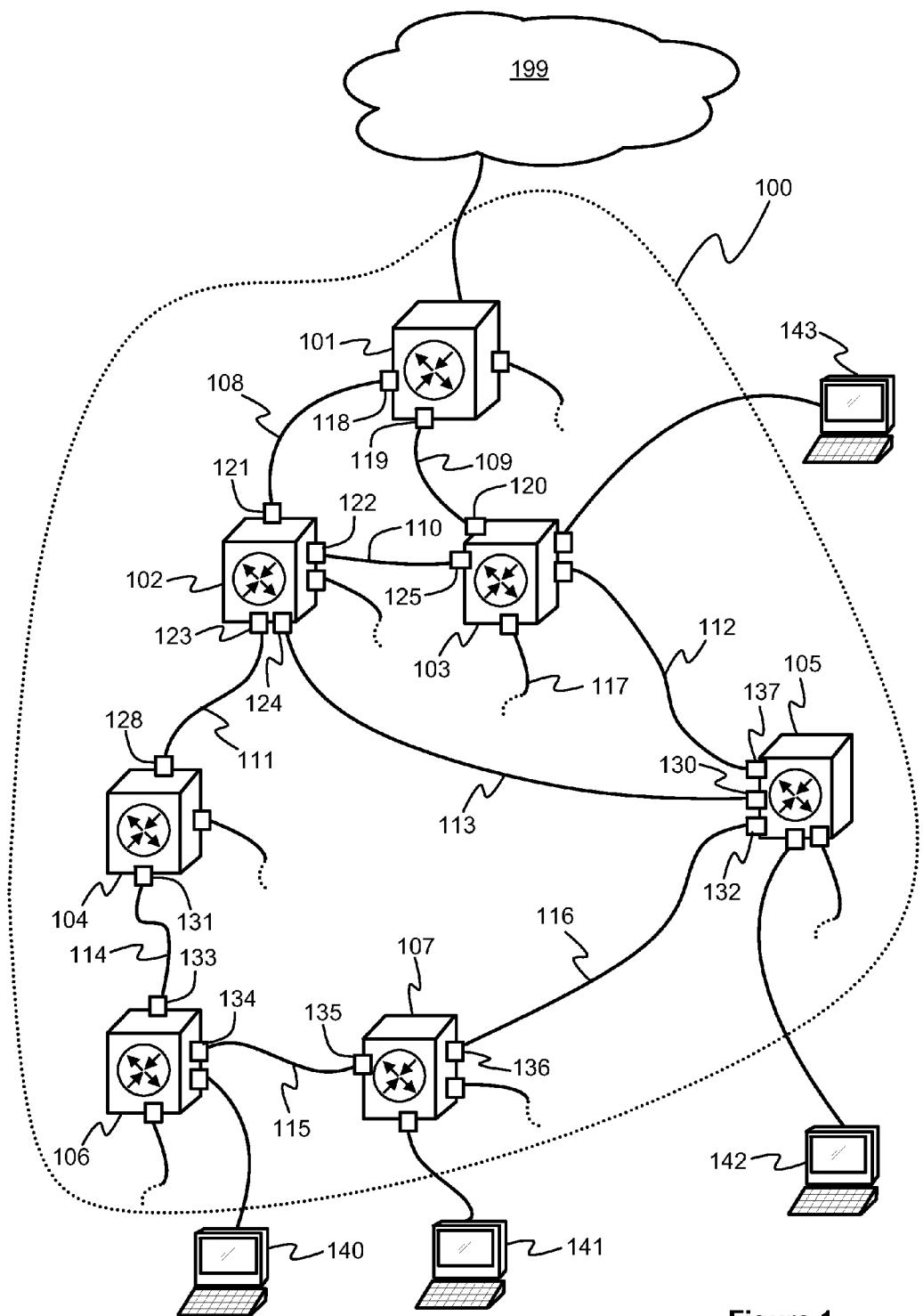
FIG. 1 shows a schematic illustration of a data transfer network according to an embodiment of the invention.

FIG. 1 shows a schematic illustration of a data transfer network 100 according to an embodiment of the invention. The data transfer network can be, for example but not necessarily, a personal area network "PAN", a local area network "LAN", a metropolitan area network "MAN", a wide area network "WAN", a combination of two or more of the above-mentioned, or a part of any of the above-mentioned. In the exemplifying case shown in FIG. 1, the data transfer network comprises network devices 101, 102, 103, 104, 105, 106, and 107 which are interconnected with data transfer links 108, 109, 110, 111, 112, 113, 114, 115, and 116. In the exemplifying case illustrated in FIG. 1, the data transfer links 108-116 are assumed to be bi-directional data transfer links. Each data transfer link may comprise for example two optical fibres or radio transceivers at its both ends. Each network device comprises one or more data interfaces so that each data interface comprises an ingress section for receiving data from a respective bi-directional data transfer link and an egress section for transmitting data to the respective bi-directional data transfer link. For example, the network device 101 comprises a data interface 118 connected to the data transfer link 108 and a data interface 119 connected to the data transfer link 109.

The data transfer network 100 is connected to an external data transfer network 199 that can be, for example, the Internet. The network devices 101-107 can be, for example but not necessarily, routers arranged to support the Internet Protocol. Furthermore, the network devices may be arranged to support, for example, the MultiProtocol Label Switching "MPLS". Terminal devices 140, 141, 142, and 143 can be connected to the data transfer network 100 as illustrated in FIG. 1. In addition to the network devices 101-107, the data transfer network may comprise network devices which are not shown in FIG. 1 and/or the data transfer network may be connected to terminal devices which are not shown in FIG. 1. This is illustrated in FIG. 1 with data transfer links drawn to continue as a dashed-line such as a data transfer link 117.

In the exemplifying case shown in FIG. 1, the network devices of the data transfer network have been organized to constitute a hierarchical logical arrangement that comprises several levels of network hierarchy. The network device 101 is a root network device that transfers all the data traffic between the data transfer network 100 and the external data transfer network 199. The network device 101 represents the highest network hierarchy in the data transfer network 100. The network devices 102 and 103 represent the next lower level of the network hierarchy, the network devices 104 and 105 represent a still lower level of the network hierarchy, and the network devices 106 and 107 represents the lowest level of the network hierarchy. Each network device is assumed to have a default data interface which provides a connection upwards in the network hierarchy. For example, the default data interface of the network device 106 is a data interface 133, the default data interface of the network device 107 is a data interface 136, the default data interface of the network device 104 is a data interface 128, the default data interface of the network device 105 is a data interface 130, the default data interface of the network device 102 is a data interface 121, and the default data interface of the network device 103 is a data interface 120.

For the sake of merely illustrative purposes and without losing generality, we assume an exemplifying situation where the network device 106 needs a set of protocol addresses for a part of the data transfer network, i.e. a sub-net, represented by the network device 106 and devices accessible via the network device 106. It is worth noting that in some cases the "set of protocol addresses" may contain only one protocol address. In order to obtain the set of protocol addresses, the network device 106 sends via the data interface 133, i.e. via its default data interface, an identifier message ID_A having an identifier ID_x upwards in the network hierarchy. It is worth noting that in some cases the identifier message ID_A can be merely the identifier ID_x, whereas in some other cases the identifier message ID_A may contain also one or more other parts in addition to the identifier ID_x. The identifier message ID_A represents a request for the set of protocol addresses. It is assumed that the network devices 104 and 102 are incapable of providing the requested set of protocol addresses. Thus, the network device 104 forwards the identifier message ID_A via the data interface 128, i.e. via the default data interface, and subsequently the network device 102 forwards the identifier message ID_A via the data interface 121 i.e. via the default data interface. The network device 101 that is the root network device receives the identifier message and allocates a set of protocol addresses Pr1 to the sub-net represented by the network device 106 and the devices accessible via the network device 106. The network device 101 sends information defining the set of protocol addresses Pr1 via the data interface 118. The information defining the set of protocol addresses Pr1 is transferred from the network device 101 to the network device 106 via the same data transfer path, but of course in the opposite direction, as the identifier message ID_A was transferred from the data interface 133 of the network device 106 to the data interface 118 of the network device 101. Thus, the information defining the set of protocol addresses Pr1 is transferred via the network devices 102 and 104 and via the data transfer links 108, 111, and 114. When the network device 102 forwards the information defining the set of protocol addresses Pr1 from its data interface 121 to its data interface 123, the network device 102 updates its forwarding database to express that the sub-net represented by the set of protocol addresses Pr1 is accessible via the data interface 123, i.e. via the data transfer link 111. Furthermore, the network device 102 is arranged to store in a memory that the identifier message ID_A was received via the data interface 123 and that the identifier ID_x carried by the identifier message ID_A is associated to the set of protocol addresses Pr1. Correspondingly, the network device 104 updates its forwarding data base to express that the sub-net represented by the set of protocol addresses Pr1 is accessible via the data interface 131, i.e. via the data transfer link 114. Furthermore, the network device 104 is arranged to store in a memory that the identifier message ID_A was received via the data interface 131 and that the identifier ID_x carried by the identifier message ID_A is associated to the set of protocol addresses Pr1. As a corollary, a data transfer path is established from the network devices 101, 102 and 104 to the sub-net represented by the network device 106 and the devices accessible via the network device 106.

Next it is assumed that the protocol address allocation is so complete in the data transfer network 100 that data transfer paths between the network devices 101-107 have been established. We further assume that there is a need to establish an alternative data transfer path from a first network device to a second network device of the data transfer network 100. Without losing generality, we further assume that the first network device is the network device 102 and that the second network device is the network device 106. In this exemplifying case, the network device 106 sends an identifier message ID_B having the same identifier ID_x as the identifier message ID_A via a data interface 134 so that the destination address of the identifier message ID_B is the protocol address of the network device 102. The identifier message ID_B is transferred from the network device 106 to the network device 102 via the network devices 107 and 105 and via the data transfer links 115, 116, and 113. The identifier message ID_B is received at a data interface 124 of the network device 102.

The network device 102 is arranged to compare the identifier message ID_B received at the data interface 124 to earlier received identifier messages. In this exemplifying case, one of the earlier received identifier messages is the identifier message ID_A carrying the same identifier ID_x and received at the data interface 123. Hence, the identifier message ID_B received at the data interface 124 matches the identifier message ID_A received earlier at the data interface 123. In response to the situation in which the identifier message received at the data interface 124 matches the identifier message received earlier at the data interface 123, the network device 102 updates its forwarding database to express that the sub-net represented by the set of protocol addresses Pr1 is accessible also via the data interface 123, i.e. via the data transfer link 113. Thereafter, the forwarding database expresses that the sub-net represented by the set of protocol addresses Pr1 is accessible via both the data interface 123 and the data interface 124. Next, the network device 102 transmits information defining the set of protocol addresses Pr1 via the data interface 124. The information defining the set of protocol addresses Pr1 is transferred from the network device 102 to the network device 106 via the network devices 105 and 107 and via the data transfer links 113, 116, and 115, i.e. via the same data transfer path but in the opposite direction as the identifier message ID_B that was transferred from the data interface 134 of the network device 106 to the data interface 124 of the network device 102.

When the network device 105 forwards the information defining the set of protocol addresses Pr1 from its data interface 130 to its data interface 132, the network device 105 updates its forwarding database to express that the sub-net represented by the set of protocol addresses Pr1 is accessible via the data interface 132, i.e. via the data transfer link 116. Correspondingly, the network device 107 updates its forwarding data base to express that the sub-net represented by the set of protocol addresses Pr1 is accessible via the data interface 135, i.e. via the data transfer link 115. As a corollary, an alternative data transfer path from the network device 102 to the network device 106 is established. The alternative data transfer path can be used for protection and/or for load sharing purposes concerning the data traffic between the network devices 102 and 106.

It is also possible that the network device 105 forwards the identifier message ID_B received at the data interface 132 via a data interface 137 to the network device 103 which, in turn, forwards the identifier message ID_B via the data interface 120 to the network device 101. The network device 101 receives the identifier message at its data interface 119. The network device 101 compares the identifier message to earlier received identifier messages and recognizes that the identifier message ID_B received at the data interface 119 matches the identifier message ID_A received earlier at the data interface 118. Next, the network device 101 transmits information defining the set of protocol addresses Pr1 via the data interface 119. The information defining the set of protocol addresses Pr1 is transferred from the network device 101 to the network device 106 via the network devices 103, 105 and 107 and via the data transfer links 109, 112, 116, and 115, and thereby an alternative data transfer path is established from the network device 101, instead of the network device 102, to the network device 106.

In response to the above-mentioned situation in which the identifier message ID_B received at the data interface 124 matches the identifier message ID_A received earlier at the data interface 123, the network device 102 may, in addition to updating its forwarding database and transmitting the address information via the data interface 124, forward the identifier message ID_B to a data interface 122. In this case, the network device 103 receives the identifier ID_x for the first time and the network device 103 forwards the identifier message ID_B via its default data interface 120 to the network device 101. The network device 101 compares the identifier message ID_B received at the data interface 119 to earlier received identifier messages. In this case one of the earlier received identifier messages is the identifier message ID_A carrying the same identifier ID_x and received at the data interface 118. Hence, the identifier message ID_B received at the data interface 119 matches the identifier message ID_A received earlier at the data interface 118. In response to this situation, the network device 101 updates its forwarding database to express that the sub-net represented by the set of protocol addresses Pr1 is accessible also via the data interface 119, i.e. via the data transfer link 109. Thereafter, the forwarding database of the network device 101 expresses that the sub-net represented by the set of protocol addresses Pr1 is accessible via both the data interface 118 and the data interface 119. Next, the network device 101 transmits information defining the set of protocol addresses Pr1 via the data interface 119. The information defining the set of protocol addresses Pr1 is transferred from the network device 101 to the network device 102 via the network device 103 and via the data transfer links 109 and 110, i.e. via the same data transfer path but in the opposite direction as the identifier message ID_B that was transferred from the data interface 122 of the network device 102 to the data interface 119 of the network device 101. When the network device 103 forwards the information defining the set of protocol addresses Pr1 from its data interface 120 to its data interface 125, the network device 103 updates its forwarding database to express that the sub-net represented by the set of protocol addresses Pr1 is accessible via the data interface 125. As a corollary, there is established an alternative data transfer path from the network device 101 to the network device 102 for such protocol data packets or other protocol data units carrying an address which match the set of protocol addresses Pr1.

In a case where an identifier message received at one of the data interfaces of the network device 102 does not match any of the earlier received identifier messages, the network device 102 may forward the identifier message via its default data interface upwards in the network hierarchy so as to request the network device 101 to send information defining a set of protocol addresses to be delivered downwards in the network hierarchy. This situation is similar to the earlier-described situation where the network device 102 received the identifier message ID_A at the data interface 123.

In a data transfer network according to an exemplifying embodiment of the invention, the network devices 101-107 are routers arranged to support the Internet Protocol "IP". In this case, the above-mentioned set of protocol addresses Pr1 can be expressed with a network address-prefix defining a sub-set of the Internet address space. Thus, the above-mentioned "information defining the set of protocol addresses Pr1" can be expressed with an appropriate network address-prefix. When the length of a network address-prefix is N bits, the above-mentioned set of protocol addresses PR1 contains those IP-addresses whose N leftmost bits are the same as the network address-prefix. The network device 102 is arranged to set its routing and forwarding table to associate the network address-prefix associated to the data interface 123 also to the data interface 124 in response to the above-mentioned situation in which the identifier message ID_B received at the data interface 124 matches the identifier message ID_A received earlier at the data interface 123. Furthermore, two or more of the network devices 101-107 can be arranged to support the MultiProtocol Label Switching "MPLS".

The identifier ID_x carried by the identifier messages ID_A and ID_B originated by the network device 106 is advantageously unique within the data transfer network 100. Alternatively, there has to be a suitable mechanism for avoiding overlaps between identifier messages originated by different network devices. The mechanism for avoiding overlaps can be based e.g. timing information that is transferred between the network devices 101-107.

In a data transfer network according to an exemplifying embodiment of the invention, an identifier messages contains a Media Access Control "MAC" address related to the network device which has originated the identifier message. For example, the above-mentioned identifier ID_x can be the MAC-address of the egress section, e.g. egress port, of the data interface 133 of the network device 106. For another example, an identifier message may contain an IP-address or any other data which can be advantageously made unique within the data transfer network.

It is worth noting that the above-described principles for creating alternative data transfer paths are applicable also in cases where the network devices are not configured to constitute a hierarchical logical arrangement. Furthermore, it is worth noting that the above-described principles for creating alternative data transfer paths between network devices can be used for creating more than two alternative data transfer paths between the network devices. In this case, a network device, such as the network device 102 shown in FIG. 1, receives mutually matching identifier messages at three or more of the data interfaces of the network device under consideration.

Figure 3A:
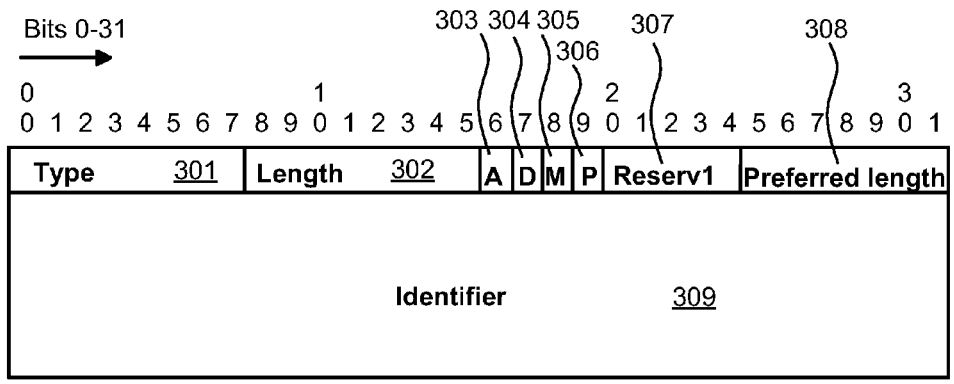
FIGS. 3a and 3b illustrate exemplifying message formats suitable for network configuration.

FIG. 3a shows a diagram illustrating an exemplifying message format that can be used as the identifier messages ID_A and ID_B originated by the network device 106 shown in FIG. 1. As described earlier in this document, the identifier message ID_A was first originated by the network device 106 for requesting a set of protocol addresses to be associated to the network device 106 and for creating a data transfer path from the network device 101 to the network device 106, and subsequently the identifier message ID_B was originated by the network device 106 for creating an alternative data transfer path from the network device 102 to the network device 106. The message format shown in FIG. 3a contains the following fields:

Type-field 301: a bit-pattern that indicates that the message is the above-described identifier message,
Length-field 302: indicates the length of the message as bits or bytes,
A-flag 303: an autonomous address-configuration flag; when set indicates that the network address-prefix received can be used for protocol address configuration,
D-flag 304: a dividable address-configuration flag; when set indicates that the sending network device would prefer a network address-prefix that can be divided for lower hierarchy network devices in the network hierarchy and when not set, a dividable network address-prefix should not be sent as a response to this identifier message,
M-flag 305: a dividable multi-address-configuration flag; when set indicates that the requesting network device would prefer a network address-prefix dividable for lower hierarchy network devices and has already received at least one dividable network address-prefix and network addresses covered by the least one earlier received dividable network address-prefix are running out,
P-flag 306: parallel data transfer path creation flag; when set indicates that the requesting network device allows/requests a parallel, i.e. alternative, data transfer path to be created in the way described above with the aid of FIG. 1,
Reserv1-field 307: an unused field for future use,
Preferred length-field 308: a hint for a network device situated at a higher level of the network hierarchy about the preferred length of the requested network address-prefix; nevertheless, the higher hierarchy network device decides the actual network address-prefix given to a requesting network device situated at a lower level of the network hierarchy; zero can be considered as there is no preference to the prefix length,
Identifier-field 309: identifier that is compared to corresponding identifiers of earlier received identifier messages to find out whether there is a match. Two identifier messages can be defined to be matching when, for example but not necessarily, the identifier fields of the two identifier messages are identical. The above-presented ID_x is an example of the identifier.

The message format shown in FIG. 3a is suitable for the IPv6-protocol. For a skilled person it is straightforward to construct a corresponding message format suitable for the IPv4-protocol or for some other communication protocol, e.g. the Connection-Less Network Service "CLNS" that uses addressing data conforming to the ISO 10589 specification "International Standards Organization".

Figure 3B:
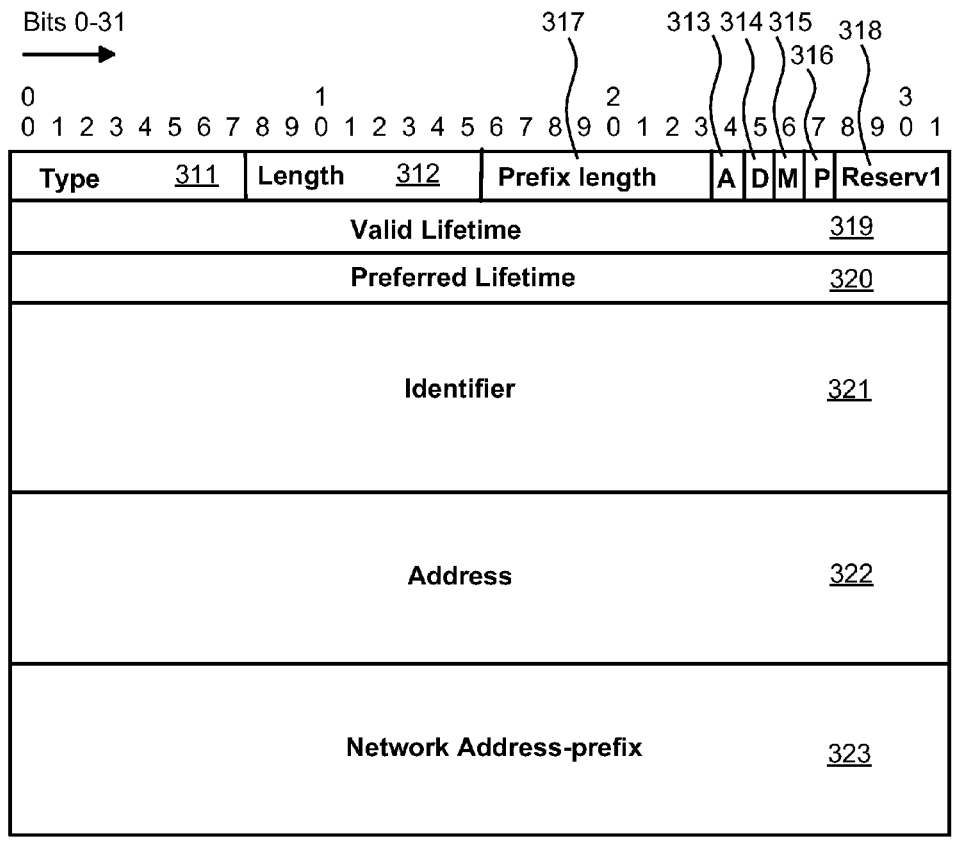

FIG. 3b shows a diagram illustrating an exemplifying message format that can be used for transferring the information defining the set of protocol addresses Pr1 from the network device 101 to the network device 106 in the data transfer network shown in FIG. 1. The message format provides a way to provide network devices situated at a lower level of the network hierarchy with protocol addresses for their own use and with protocol addresses that can be further delivered for the use of network devices situated at a still lower level of the network hierarchy. The message can appear e.g. in a Router Advertisement message. The message format shown in FIG. 3b contains the following fields:

Type-field 311: a bit-pattern that indicates that the message contains a network address-prefix defining a set of protocol addresses,
Length-field 312: indicates the length of the message as bits or bytes,
A-flag 313: an autonomous address-configuration flag; when set indicates that the network address-prefix contained by this message can be used for protocol address configuration,
D-flag 314: a dividable address-configuration flag; when set indicates that the network address-prefix can be divided for lower hierarchy network devices,
M-flag 315: a dividable multi-address-configuration flag; when set indicates that the network address-prefix can be divided for lower hierarchy network devices without affecting older network address allocations, P-flag 316: parallel data transfer path creation flag; when set indicates that a parallel, i.e. alternative, data transfer path is being created in the way described above with the aid of FIG. 1, Prefix length-field 317: the number of bits of the network address-prefix that are valid, i.e. the length of the network address-prefix, Reserved1-field 318: an unused field for future use, Valid lifetime-field 319: the length of time the network address-prefix is valid from the time instant the message is sent for the purpose of on-link determination; the value of all bits one can be defined to represent infinity; the Valid Lifetime can also be used by the IPv6-address auto-configuration "ADDRCONF", Preferred lifetime-field 320: The length of time the network addresses generated from the prefix remain preferred in the IPv6-address auto-configuration "ADDRCONF"; the value of all bits one can be defined to represent infinity.

Identifier-field 321: identifier that associates the message carrying the network address-prefix to a corresponding identifier message, Address-field 322: The protocol address of the network device sending this message, Network address-prefix field 323: The network address-prefix contained by this message, if the D-flag is set this network address-prefix can be divided and the divisions can be delivered to network devices situated at a lower level of the network hierarchy.

The message format shown in FIG. 3*b* is suitable for the IPv6-protocol. For a skilled person it is straightforward to construct a corresponding message format suitable for the IPv4-protocol or for some other communication protocol, e.g. the Connection-Less Network Service "CLNS".

Figure 2:
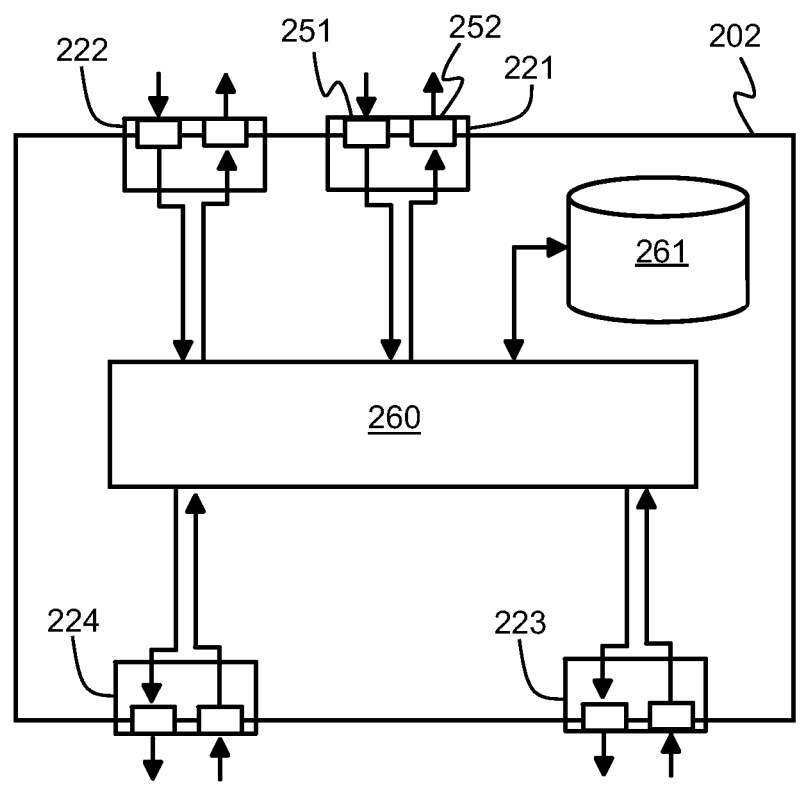
FIG. 2 shows a schematic illustration of a network device according to an embodiment of the invention.

FIG. 2 shows a schematic illustration of a network device 202 according to an embodiment of the invention. The network device comprises data interfaces 221, 222, 223, and 224. Each of the data interfaces comprises an ingress section for receiving data from a data transfer network and an egress section for transmitting data to the data transfer network. For example, data interface 221 comprises an ingress section 251 and an egress section 252. The network device comprises a processing circuitry 260 arranged to:

compare a first identifier message received at a first one of the data interfaces to earlier received identifier messages, and in response to a situation in which the first identifier message matches a second identifier message that is one of the earlier received identifier messages and has been received at a second one of the data interfaces: a) update a forwarding database to express that one or more protocol addresses associated to a part of the data transfer network originated the second identifier message and accessible via the second one of the data interfaces is/are associated to the first one of the data interfaces so as to indicate that the part of the data transfer network is accessible also via the first one of the data interfaces, and b) transmit information defining the one or more protocol addresses via the first one of the data interfaces so as to enable creation of a data transfer path through the data transfer network and via the first one of the data interfaces for data traffic addressed to the part of the data transfer network.

The above-mentioned first and second ones of the data interfaces can be the data interfaces 224 and 223, respectively. The above-mentioned first and second identifier messages may contain, for example but not necessarily, a Media Access Control address related to another network device, such as the network device 106 shown in FIG. 1, which has sent the first identifier message via a first data interface of the other network device and the second identifier message via a second data interface of the other network device.

The network device may comprise a memory 261 for storing the identifier messages so that each received identifier message can be compared to the earlier received identifier messages. Alternatively, the network device may comprise means for connecting to an external memory device.

The processing circuitry 260 is advantageously arranged to forward, in response to a situation in which the first identifier message does not match any of the earlier received identifier messages, the first identifier message to a predetermined third one of the data interfaces so as to request, from another network device, information defining the one or more protocol addresses to be associated to the first one of the data interfaces. The above-mentioned third one of the data interfaces can be the data interface 221.

In a network device according to an exemplifying embodiment of the invention, the processing circuitry 260 is arranged to forward, in response to the situation in which the first identifier message matches the second identifier message, the first identifier message to a fourth one of the data interfaces so as to enable establishment of parallel data transfer paths one of which reaching the network device via the third one of the data interfaces and another of which reaching the network device via the fourth one of the data interfaces. The above-mentioned fourth one of the data interfaces can be the data interface 222.

In a network device according to an exemplifying embodiment of the invention, the processing circuitry 260 is capable of being aware, for each of the data interfaces, whether the data interface under consideration is a data interface providing access to an upper hierarchy level of the data transfer network wherefrom information defining the one or more protocol addresses is obtainable. For each data interface, there can be for example status information that indicates whether the data interface under consideration provides access to the upper hierarchy level.

In a network device according to an exemplifying embodiment of the invention, the processing circuitry 260 is arranged to support the Internet Protocol. In this exemplifying case, the one or more protocol addresses associated to the second one of the data interfaces can be expressed with a network address-prefix defining a subset of the Internet address space. The processing circuitry is arranged to update, in response to the situation in which the first identifier message matches the second identifier message, a routing and forwarding table to express that the network address-prefix associated to the second one of the data interfaces and to the second identifier message is associated also to the first one of the data interfaces.

In a network device according to an exemplifying embodiment of the invention, the processing circuitry 260 is arranged to support the MultiProtocol Label Switching "MPLS".

The processing circuitry 260 can comprise one or more of the following: a programmable processor, a dedicated hardware processor such as an application specific integrated circuit "ASIC", and/or a field configurable integrated circuit such as a field programmable gate array "FPGA".

Figure 4:
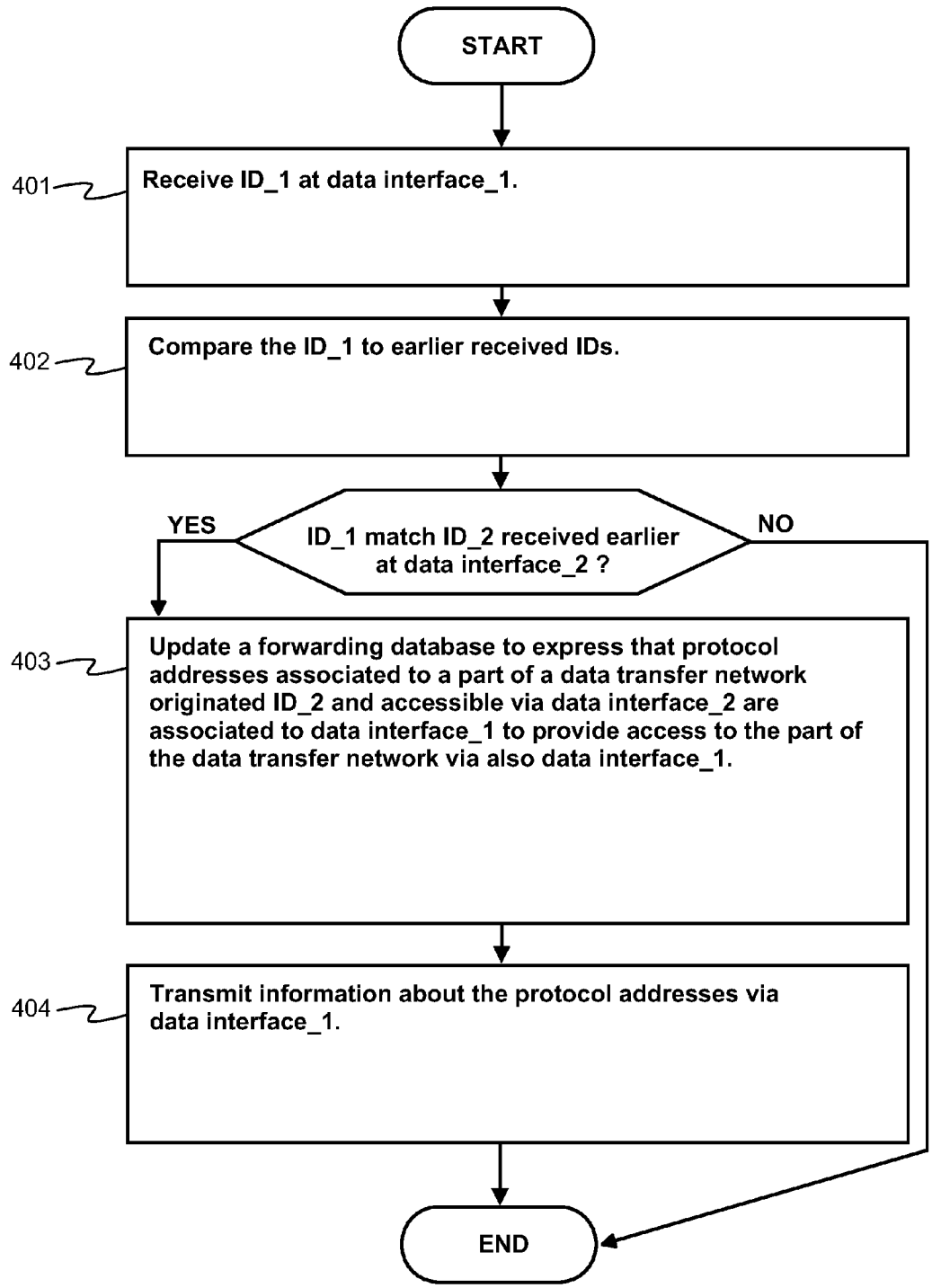
FIG. 4 shows a flow chart of a method according to an embodiment of the invention for network configuration.

FIG. 4 shows a flow chart of a method according to an embodiment of the invention for network configuration. The method comprises:

phase 401: receiving a first identifier message ID_1 at a first one of data interfaces of a network device, each data interface comprising an ingress section for receiving data from a data transfer network and an egress section for transmitting data to the data transfer network, and phase 402: comparing the first identifier message ID_1 to earlier received identifier messages, and in response to a situation in which the first identifier message ID_1 matches a second identifier message ID_2 that is one of the earlier received identifier messages and has been received at a second one of the data interfaces:

phase 403: updating a forwarding database to express that one or more protocol addresses associated to a part of the data transfer network originated the second identifier message and accessible via the second one of the data interfaces is/are associated to the first one of the data interfaces so as to indicate that the part of the data transfer network is reachable also via the first one of the data interfaces, and phase 404: transmitting information defining the one or more protocol addresses via the first one of the data interfaces so as to enable creation of a data transfer path through the data transfer network and via the first one of the data interfaces of the network device for data traffic addressed to the part of the data transfer network.

A method according to an exemplifying embodiment of the invention comprises forwarding, in response to a situation in which the first identifier message does not match any of the earlier received identifier messages, the first identifier message to a pre-determined third one of the data interfaces so as to request, from another network device, information defining one or more protocol addresses to be associated to the first one of the data interfaces.

In a method according to an exemplifying embodiment of the invention, the data transfer network is organized to constitute a hierarchical logical arrangement having at least three levels of network hierarchy, and the first and second data interfaces provide access downwards in the network hierarchy and the third data interface provides access upwards in the network hierarchy.

A method according to an exemplifying embodiment of the invention further comprises forwarding, in response to the situation in which the first identifier message matches the second identifier message, the first identifier message to a fourth one of the data interfaces so as to enable establishment of parallel data transfer paths one of which reaching the network device via the third one of the data interfaces and another of which reaching the network device via the fourth one of the data interfaces.

In a method according to an exemplifying embodiment of the invention, the Internet Protocol is used. The one or more protocol addresses associated to the second one of the data interfaces are expressed with a network address-prefix defining a sub-set of the Internet address space. The routing and forwarding table is updated, in response to the situation in which the first identifier message matches the second identifier message, to express that the network address-prefix associated to the second one of the data interfaces and to the second identifier message is associated also to the first one of the data interfaces.

In a method according to an exemplifying embodiment of the invention, the MultiProtocol Label Switching "MPLS" is used.

In a method according to an exemplifying embodiment of the invention, the first and second identifier messages contain a Media Access Control address related to another network device which has sent the first identifier message via a first data interface of the other network device and the second identifier message via a second data interface of the other network device.

A computer program according to an exemplifying embodiment of the invention comprises computer executable instructions for controlling a programmable processing circuitry to carry out a method according to any of the above-described exemplifying embodiments of the invention.

A computer program according to an exemplifying embodiment of the invention for network configuration comprises computer executable instructions for controlling a programmable processing circuitry of a network device to:

compare a first identifier message received at a first one of data interfaces of the network device to earlier received identifier messages, and in response to a situation in which the first identifier message matches a second identifier message that is one of the earlier received identifier messages and has been received at a second one of the data interfaces of the network device: a) update a forwarding database to express that one or more protocol addresses associated to a part of the data transfer network originated the second identifier message and accessible via the second one of the data interfaces of the network device is/are associated to the first one of the data interfaces of the network device so as to indicate that the part of the data transfer network is accessible also via the first one of the data interfaces of the network device, and b) transmit information defining the one or more protocol addresses via the first one of the data interfaces so as to enable creation of a data transfer path through the data transfer network and via the first one of the data interfaces of the network device for data traffic addressed to the part of the data transfer network.

The computer executable instructions can be e.g. subroutines or functions implemented with a suitable programming language and with a compiler suitable for the programming language and for the programmable processing circuitry.

A computer program product according to an exemplifying embodiment of the invention comprises a non-volatile computer readable medium, e.g. a compact disc "CD", encoded with a computer program according to an exemplifying embodiment of invention.

A signal according to an exemplifying embodiment of the invention is encoded to carry information defining a computer program according to an exemplifying embodiment of invention.

The specific examples provided in the description given above should not be construed as limiting the scope and/or the applicability of the appended claims.

What is claimed is:

1. A network device comprising:
   data interfaces each comprising an ingress section configured to receive data from a data transfer network and an egress section configured to transmit data to the data transfer network;
   a processing circuitry configured to:
      compare a first identifier message received at a first one of the data interfaces to earlier received identifier messages, and
      in response to a situation in which the first identifier message matches a second identifier message that is one of the earlier received identifier messages and has been received at a second one of the data interfaces:

a) update a forwarding database to express that one or more protocol addresses associated to other network device originated the second identifier message and accessible via the second one of the data interfaces is associated to the first one of the data interfaces to indicate that the other network device is also accessible via the first one of the data interfaces, and b) transmit information defining the one or more protocol addresses via the first one of the data interfaces to enable creation of a data transfer path through the data transfer network and via the first one of the data interfaces for data traffic addressed to the other network device and to be an alternative of another data transfer path via the second one of the data interfaces to the other network device, wherein the processing circuitry is configured to forward, in response to a situation in which the first identifier message does not match any of the earlier-received identifier messages, the first identifier message to a pre-determined third one of the data interfaces to request, from an additional network device different than the network device and the other network device, information defining the one or more protocol addresses.

2. The network device according to claim 1, wherein the processing circuitry is further configured to forward, in response to the situation in which the first identifier message matches the second identifier message, the first identifier message to a fourth one of the data interfaces to enable establishment of parallel data transfer paths, one of the parallel data transfer paths reaching the network device via the third one of the data interfaces and another of the parallel data transfer paths reaching the network device via the fourth one of the data interfaces.

3. The network device according to claim 1, wherein the processing circuitry is configured to be aware, for each of the data interfaces, whether the data interface under consideration is a data interface providing access to an upper hierarchy level of the data transfer network wherefrom information defining the one or more protocol addresses is obtainable.

4. The network device according to claim 1, wherein the processing circuitry is configured to support the Internet Protocol, the one or more protocol addresses associated to the second one of the data interfaces being expressed with a network address-prefix defining a sub-set of the Internet address space.

5. The network device according to claim 4, wherein the processing circuitry is configured to update, in response to the situation in which the first identifier message matches the second identifier message, a routing and forwarding table to express that the network address-prefix associated to the second one of the data interfaces and to the second identifier message is also associated to the first one of the data interfaces.

6. The network device according to claim 1, wherein the processing circuitry is configured to support the Multi Protocol Label Switching.

7. The network device according to claim 1, wherein the first and second identifier messages contain a Media Access Control address or an Internet Protocol address related to the other network device which has sent the first identifier message via a first data interface of the other network device and the second identifier message via a second data interface of the other network device.

8. A data transfer network comprising:
network devices interconnected with data transfer links, the network devices including at least one first network device and at least one second network device,
wherein the first network device is arranged to:
compare a first identifier message received at a first one of data interfaces of the first network device to earlier received identifier messages, each data interface comprising an ingress section for receiving data and an egress section for transmitting data, and the first identifier message being transferred from the second network device to the first network device via a first data transfer path through the data transfer network, and in response to a situation in which the first identifier message matches a second identifier message that is one of the earlier received identifier messages and has been received at a second one of the data interfaces of the first network device:

a) update a forwarding database to express that one or more protocol addresses associated to the second network device accessible via the second one of the data interfaces of the first network device is/are associated to the first one of the data interfaces of the first network device so as to indicate that the second network device is accessible also via the first one of the data interfaces of the first network device, and b) transmit information defining the one or more protocol addresses via the first one of the data interfaces of the first network device so as to determine the first data transfer path to be an alternative of a second data transfer path via which the second identifier message has been transferred from the second network device to the first network device, wherein the first network device is configured to forward, in response to a situation in which the first identifier message does not match any of the earlier-received identifier messages, the first identifier message to a pre-determined third one of the data interfaces to request, from an additional network device different than the first network device and the second network device, information defining the one or more protocol addresses.

9. The data transfer network according to claim 8, wherein the first network device is further configured to forward, in response to the situation in which the first identifier message matches the second identifier message, the first identifier message to a fourth one of the data interfaces of the first network device so as to enable establishment of parallel data transfer paths one of which providing a data transfer path between the first and third network devices via the third one of the data interfaces of the first network device and another of which providing an alternative data transfer path between the first and third network devices via the fourth one of the data interfaces of the first network device.

10. The data transfer network according to claim 8, wherein the network devices are routers configured to support the Internet Protocol, the one or more protocol addresses associated to the second one of the data interfaces of the first network device being expressed with a network address-prefix defining a sub-set of the Internet address space.

11. The data transfer network according to claim 10, wherein the first network device is configured to update, in response to the situation in which the first identifier message matches the second identifier message, a routing and forwarding table to express that the network address-prefix associated to the second one of the data interfaces of the first network device and to the second identifier message is associated also to the first one of the data interfaces of the first network device.

12. The data transfer network according to claim 8, wherein one or more of the network devices are arranged to support the Multi Protocol Label Switching.

13. The data transfer network according to claim 8, wherein the first and second identifier messages contain a Media Access Control address or an Internet Protocol address related to the second network device, the first identifier message being transferred via a first data interface of the second network device and the second identifier message being transferred via a second data interface of the second network device.

14. The data transfer network according to claim 8, wherein the network devices are organized to constitute a hierarchical logical arrangement having at least three levels of network hierarchy where the second network device is at a lower level of the network hierarchy than the first network device and the third network device is at an upper level of the network hierarchy than the first network device, the first network device being arranged to receive information defining the one or more protocol addresses from the third network device and to deliver, to the second network device, information defining protocol addresses to be allocated for the second network device.

15. A method for network configuration, the method comprising:
  receiving a first identifier message at a first one of data interfaces of a network device, each data interface comprising an ingress section configured to receive data from a data transfer network and an egress section configured to transmit data to the data transfer network;
  comparing the first identifier message to earlier received identifier messages; and
  in response to a situation in which the first identifier message matches a second identifier message that is one of the earlier received identifier messages and has been received at a second one of the data interfaces of the network device:
    a) updating a forwarding database to express that one or more protocol addresses associated to other network device originated the second identifier message and accessible via the second one of the data interfaces of the network device is associated to the first one of the data interfaces of the network device to indicate that the other network device is also accessible via the first one of the data interfaces of the network device, and
    b) transmitting information defining the one or more protocol addresses via the first one of the data interfaces to enable creation of a data transfer path through the data transfer network and via the first one of the data interfaces of the network device for data traffic addressed to the other network device and to be an alternative of another data transfer path via the second one of the data interfaces to the other network device,
  wherein, in response to a situation in which the first identifier message does not match any of the earlier-received identifier messages, the first identifier message is forwarded to a pre-determined third one of the data interfaces to request, from an additional network device different than the network device and the other network device, information defining the one or more protocol addresses.

16. A non-volatile computer readable medium encoded with a computer program for network configuration, the computer program comprising computer executable instructions for controlling a programmable processing circuitry of a network device to:
  compare a first identifier message received at a first one of data interfaces of the network device to earlier received identifier messages; and
  in response to a situation in which the first identifier message matches a second identifier message that is one of the earlier received identifier messages and has been received at a second one of the data interfaces of the network device:
    a) update a forwarding database to express that one or more protocol addresses associated to other network device originated the second identifier message and accessible via the second one of the data interfaces of the network device is associated to the first one of the data interfaces of the network device to indicate that the other network device is also accessible via the first one of the data interfaces of the network device, and
    b) transmit information defining the one or more protocol addresses via the first one of the data interfaces to enable creation of a data transfer path through the data transfer network and via the first one of the data interfaces of the network device for data traffic addressed to the other network device and to be an alternative of another data transfer path via the second one of the data interfaces to the other network device,
  wherein, in response to a situation in which the first identifier message does not match any of the earlier-received identifier messages, the first identifier message is forwarded to a pre-determined third one of the data interfaces to request, from an additional network device different than the network device and the other network device, information defining the one or more protocol addresses.

* * * * *